No. 639,229. Patented Dec. 19, 1899.
A. GRISSO.
HAME TUG.
(Application filed Mar. 23, 1899.)
(No Model.)
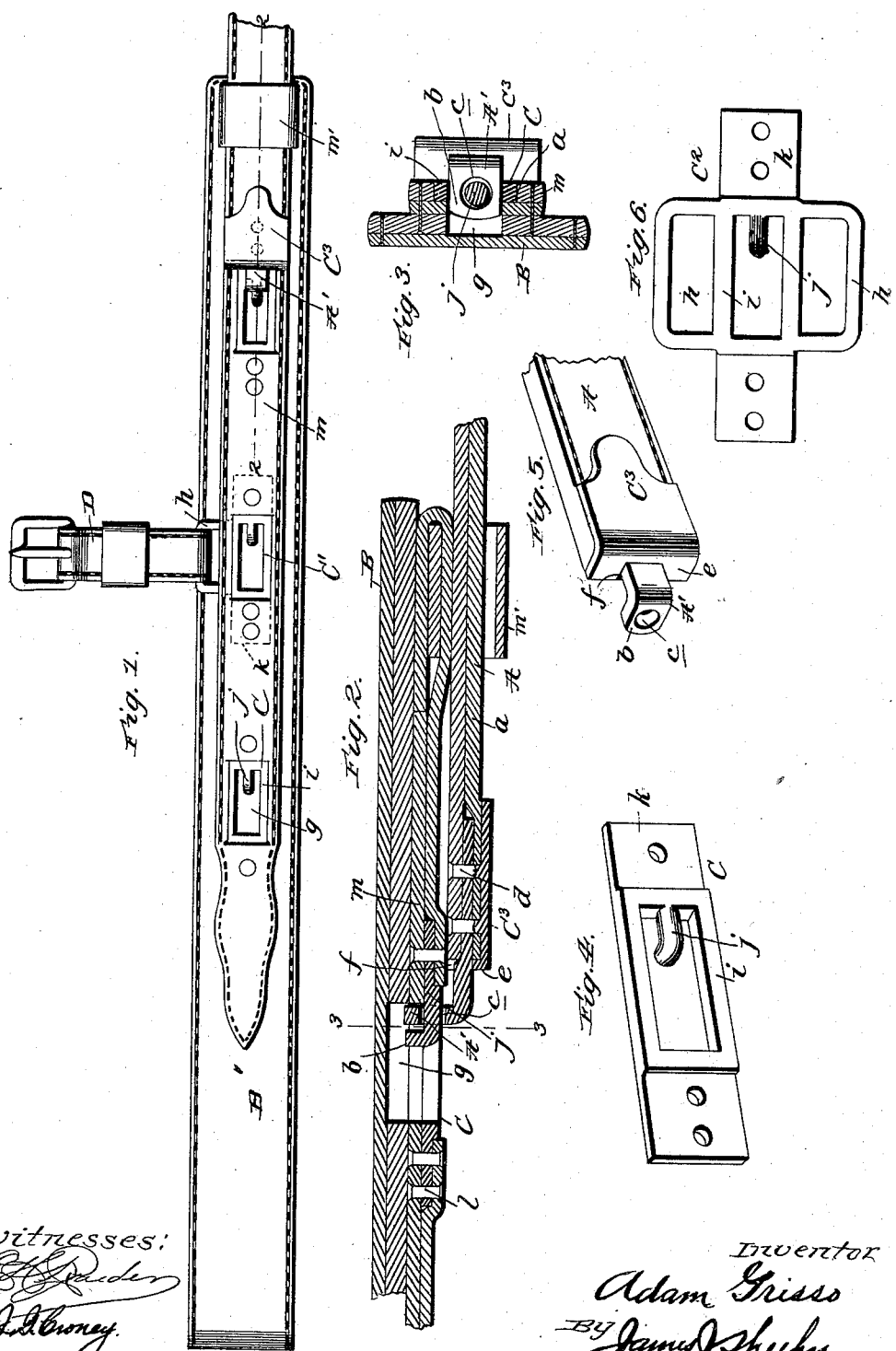
Witnesses:
Inventor
Adam Grisso
By James J Sheehy
Attorney

UNITED STATES PATENT OFFICE.

ADAM GRISSO, OF NORTH WEBSTER, INDIANA.

HAME-TUG.

SPECIFICATION forming part of Letters Patent No. 639,229, dated December 19, 1899.

Application filed March 23, 1899. Serial No. 710,221. (No model.)

*To all whom it may concern:*

Be it known that I, ADAM GRISSO, a citizen of the United States, residing at North Webster, in the county of Kosciusko and State of Indiana, have invented new and useful Improvements in Harness, of which the following is a specification.

My invention relates to harness, and has for one of its objects to provide a simple and durable connection between a breast collar or strap and a trace and which, while adapted to permit of the breast-strap and trace being readily connected, disconnected, and adjusted, is calculated to effectually prevent casual disconnection of the same.

Another object is to provide in conjunction with such adjustable connection means for receiving a back band or strap and a belly-band or girth.

Other advantageous features of the invention will be fully understood from the following description and claims when taken in conjunction with the annexed drawings, in which—

Figure 1 is a side elevation illustrating a breast-strap and trace equipped with my improvements and connected in accordance with my invention. Fig. 2 is a detail section taken in the plane of line 2 2 of Fig. 1. Fig. 3 is a transverse section taken on line 3 3 of Fig. 2. Fig. 4 is a detail perspective view of one of the keeper-plates of the breast-strap. Fig. 5 is a perspective view of one end of the trace, illustrating the hook and the receiving-plate thereon. Fig. 6 is an elevation of a modified form of keeper-plate for use in conjunction with the breast-strap.

Referring by letter to said drawings, and more particularly to Figs. 1 to 5 thereof, A is a trace, which may be and preferably is of the ordinary construction, with the exception that it is provided at its forward end with a hook $A'$ and a reinforcing-plate C. (Best shown in Figs. 2 and 5.) The hook $A'$ is arranged between the layers of leather $a$ comprised in the trace and extends forward of the same, where it is provided with an angular inwardly-directed arm $b$, having an aperture $c$ for a purpose presently described. Said hook is connected to the layers of leather $a$ and to the plate C by transverse rivets $d$, formed integral with the latter, and its connection to the leather layers $a$ is also strengthened by the forward angular branch $e$ of the plate $C^3$. Such angular branch $e$ is notched, as indicated by $f$, to receive the hook, and, in addition to strengthening the connection of the hook to the leather layers $a$, is designed to cover and protect the ends of said leather layers.

B is a breast collar or strap, of which but one end portion is shown, the other end portion being similarly constructed and equipped. The said breast-strap is provided at intervals in its illustrated end portion with three (more or less) recesses $g$, oblong in form and of about the proportional size and depth illustrated. It is also provided with three keeper-plates C $C'$, which are similar in construction, with the exception that the middle plate $C'$ is provided with a loop $h$, which is lacking in the others. The said plates, which are each formed in one piece, respectively comprise a rectangular body $i$, an angular hook $j$, extending forwardly and thence inwardly from the rear end bar of said body, and apertured portions $k$ at opposite ends of the bodies. The bodies of the keeper-plates are arranged in the recesses $g$ of the breast-strap, and their apertured end portions $k$ are interposed between and connected by rivets $l$ to leather layers $m$, comprised in the breast-strap. It follows from this that the connection of the keeper-plates to the breast-strap is a strong and durable one and that there is no danger of said plates pulling away from the strap.

The loop $h$ of the keeper-plate $C'$ is designed for the connection of a short strap D, which in turn is designed for the connection of a neck strap or straps. (Not shown.)

When it is desired to connect a belly-band or girth as well as a back band or strap to the breast-strap B, I will employ a keeper-plate $C^2$, such as shown in Fig. 6, in lieu of the plate $C'$. (Shown in Fig. 1.) The said plate $C^2$ is similar to the plate $C'$, with the exception that it has loops $h$ above and below its body $i$.

In connecting a brace and a breast-strap embracing my invention the trace is passed through a strap-loop $m'$ at the end of the breast-strap and its forward end portion is held at right angles to the breast-strap. In this position the hook $A'$ on the trace is inserted in the desired recess *g* of the breast-strap and is moved rearwardly and then drawn outwardly, so as to draw it on the hook *j* of the keeper-plate, after which the trace is drawn rearwardly until it lies flat against the breast-strap. With this done the apertured hook A' of the trace will have assumed the position shown in Fig. 2 with respect to the hook *j* of one of the keeper-plates, and hence a casual disconnection of the trace from the breast-strap is precluded. To disconnect the trace from the breast-strap, the operation described is reversed.

The trace may be very readily connected to and disconnected from the breast-strap in the manner described, and by reason of the breast-strap being provided with the plurality of recesses and keeper-plates at intervals in its length the harness may be very quickly adapted to horses of various sizes, which is an important advantage.

Having thus described my invention, what I claim is—

1. A harness member having a recess in its face, and also having a longitudinally and inwardly extending hook arranged in said recess; in combination with a second harness member having a hook provided with an angular apertured portion adapted to enter the recess and engage the hook of the first-named member, substantially as specified.

2. A harness member made up of layers of leather and having a recess in its face, and also having a keeper-plate comprising an open body arranged in the recess and provided with a longitudinally and inwardly extending hook, one or more loops, and portions at opposite ends of the body interposed and secured between the layers of leather; in combination with a second harness member having a hook provided with an inwardly-directed angular apertured portion adapted to enter the recess and engage the hook of the first-named member, substantially as specified.

3. In a harness, the combination with a breast-strap having recesses in its face at intervals in its length and also having longitudinally and inwardly extending hooks arranged in said recesses; of a trace having a hook provided with an angular apertured portion adapted to enter the recesses of the breast-strap and engage the hooks therein, substantially as specified.

In testimony whereof I have hereunto set my hand in presence of two subscribing witnesses.

ADAM GRISSO.

Witnesses:
  V. D. MOCK,
  HIRAM B. RITTER.